(12) United States Patent
Björn et al.

(10) Patent No.: US 9,232,692 B2
(45) Date of Patent: Jan. 12, 2016

(54) ROBOTIC LAWNMOWER

(75) Inventors: Jonathan Björn, Jönköping (SE); Martin Elonsson, Huskvarna (SE)

(73) Assignee: HUSQVARNA AB, Huskvarna (SE)

(*) Notice: Subject to any disclaimer, the term of this patent is extended or adjusted under 35 U.S.C. 154(b) by 0 days.

(21) Appl. No.: 14/380,500

(22) PCT Filed: Feb. 22, 2012

(86) PCT No.: PCT/SE2012/050197
§ 371 (c)(1),
(2), (4) Date: Aug. 22, 2014

(87) PCT Pub. No.: WO2013/125995
PCT Pub. Date: Aug. 29, 2013

(65) Prior Publication Data
US 2014/0373497 A1    Dec. 25, 2014

(51) Int. Cl.
*A01D 34/00*    (2006.01)
*A01D 75/18*    (2006.01)
*A01D 75/20*    (2006.01)

(52) U.S. Cl.
CPC ............. *A01D 34/008* (2013.01); *A01D 75/18* (2013.01); *A01D 75/20* (2013.01); *G05D 2201/0208* (2013.01); *Y10S 901/01* (2013.01)

(58) Field of Classification Search
CPC ..... A01D 34/008; A01D 75/18; A01D 75/20; G05D 2201/0208; G05D 1/021; A47L 2201/04; Y10S 901/01
USPC .................. 180/274; 700/258; 901/1
See application file for complete search history.

(56) References Cited

U.S. PATENT DOCUMENTS 7,402,974 B2    7/2008    Jeon
7,765,635 B2*    8/2010    Park ................................ 15/319

FOREIGN PATENT DOCUMENTS

CN    201557392 U    8/2010
DE    3814582 A1    11/1988
(Continued)

OTHER PUBLICATIONS

English Abstract from CN201557392 (listed as "EPODOC/EPO" on International Search Report) printed on Aug. 10, 2012.
(Continued)

*Primary Examiner* — Keith Frisby
(74) *Attorney, Agent, or Firm* — Nelson Mullins Riley & Scarborough LLP

(57) ABSTRACT

A lift detection arrangement (100, 200) in a robotic lawnmower for detecting a lift of a body (110, 210) relative a chassis (105, 205) of the robotic lawnmower is provided. The lift detection arrangement (100, 200) comprises a connection between the chassis (105, 205) and the body (110, 220). The connection comprises a joystick element (115, 215) 5 arranged to allow a displacement of the body (1110, 210) relative the chassis (105, 205) in a collision plane during a collision, and a lift element (120, 220) arranged to provide a flexibility between the chassis (105, 205) and the body (110, 210) in a lift direction during the lift. The lift detection arrangement (100, 200) further comprises a lift sensor configured to detect a displacement over a predetermined threshold of the lift element (120, 220) 10 during the lift by detecting a change in spacing between two sensor parts (125, 126, 225, 226). One of the two sensor parts (125, 126, 225, 226) is arranged on the lift element and the two sensor parts (125, 126, 225, 226) are arranged to be relatively displaceable only in the lift direction.

8 Claims, 7 Drawing Sheets

(56) References Cited

FOREIGN PATENT DOCUMENTS

| EP | 2425700 | A2 | 3/2012 |
| WO | 03103375 | A1 | 12/2003 |
| WO | 2011035691 | A1 | 3/2011 |

OTHER PUBLICATIONS

International Search Report and Written Opinion of PCT/SE2012/050197 mailed Oct. 15, 2012.
Chapter I International Preliminary Report on Patentability of PCT/SE2012/050197 mailed Aug. 26, 2014.

* cited by examiner

ROBOTIC LAWNMOWER

TECHNICAL FIELD

Embodiments herein relate to a lift detection arrangement in a robotic lawnmower. In particular, embodiments herein relate to a lift detection arrangement for detecting a lift of a body of the robotic lawnmower relative a chassis of the robotic lawnmower.

BACKGROUND

A robotic lawnmower is a device configured to autonomously move across a lawn to cut grass by means of a rotating cutting blade. The robotic lawnmower comprises a chassis to which ground engaging wheels and the cutting blade are attached. The robotic lawnmower further comprises a body arranged above the chassis. A function of the body is to prevent people from being injured by the cutting blade, as well as to protect the chassis and cutting blade from rain, dirt and clippings which may cause clogging and malfunction of the robotic lawnmower.

The body may be flexibly attached relative the body in the travelling plane or collision plane, such that a relative displacement of the body relative the chassis is possible if the body collides with an obstacle. This is to enable the robotic lawnmower to detect the obstacle and move away from it.

For this purpose, the connection between the body and the chassis may be arranged to allow relative movement between the body and the chassis in the collision plane, i.e. in a plane essentially parallel to the lawn that is being cut.

A further feature of the robotic lawnmower is an arrangement for lift detection.

This is important for protecting people from being injured by the cutting blade when the robotic lawnmower is lifted during operation, and lift detection arrangements are therefore usually arranged to automatically stop rotation of the cutting blade when a lift is detected.

By having a lift detection arrangement for detecting a lift of the body relative the chassis, it is possible to quickly stop rotation of the cutting blade. Such detection requires a connection of the body to the chassis which allows flexibility in a lift direction.

A problem is that it is difficult to distinguish a lift from a collision, since both lifts and collisions cause the body to flex relative the chassis.

This may cause false lift detections and unnecessary stops of the robotic lawnmower.

SUMMARY

In view of the discussion above, it is an object for embodiments herein to provide an improved lift detection arrangement in a robotic lawnmower.

According to a first aspect, the object is achieved by a lift detection arrangement in a robotic lawnmower for detecting a lift of a body of the robotic lawnmower relative a chassis of the robotic lawnmower. The lift detection arrangement comprises a connection between the chassis and the body. The connection comprises a joystick element and a lift element. The joystick element is arranged to allow a displacement of the body relative the chassis in a collision plane during a collision of the robotic lawnmower. The lift element is arranged to provide flexibility between the chassis and the body in a lift direction during the lift. The lift detection arrangement further comprises a lift sensor. The lift sensor is configured to detect a displacement over a predetermined threshold of the lift element during the lift by detecting a change in spacing between two sensor parts. One of the two sensor parts is arranged on the lift element and the two sensor parts are arranged to be relatively displaceable only in the lift direction.

Thanks to the two sensor parts being arranged to be relatively displaceable only in the lift direction, false lift detections during collisions can be avoided while the lift detection arrangement still allows for flexibility in the collision plane.

This provides an improved lift detection arrangement.

According to some embodiments herein, the lift element is a sliding member which is slidingly arranged relative the joystick element in the lift direction to provide the flexibility during the lift. In such embodiments, one of the two sensor parts may then be arranged on the joystick element and the other one of the two sensor parts may be arranged on the sliding member.

By slidingly arranged relative the joystick element in the lift direction it is understood that the sliding member is interconnected with the joystick element in such a way that it may slide, or move transversally, along the joystick element in the lift direction. Thereby the sliding member provides flexibility in the connection between the chassis and the body in the lift direction.

Thanks to one of the two sensor parts being arranged on the lift element and the other sensor part being arranged on the joystick member, the sensor parts are only movable relative each other in the lift direction, thereby preventing false lift detections during collisions.

The sliding member may be telescopically extendable from the joystick element in the lift direction.

This may facilitate the arrangement of the sensor parts on the sliding member and on the joystick member.

The two sensor parts may be arranged on respective downwardly protruding end portions of the joystick element and the lift element, which are arranged at a distance from a pivot connection between the joystick element and the chassis.

The two sensor parts may also be arranged on respective upwardly protruding end portions of the joystick element and the lift element, which are arranged at a distance from a pivot connection between the joystick element and the chassis.

This may facilitate assembly of the sensor parts and prevent unnecessary ware due to pivotations during collisions.

According to some embodiments herein, the lift element is a link arm supporting the joystick element, which link arm is rotatably connected to the chassis to provide the flexibility during the lift by being rotatable in the lift direction. In such embodiments, one of the two sensor parts may be arranged on the chassis and the other sensor part may be arranged on arranged on the link arm.

The link arm may then further be arranged to rest on a support extending from the chassis when it is not lifted.

According to some embodiments herein one of the two sensor parts is a Hall Effect sensor and the other one of the two sensor parts is a magnet.

According to some embodiments herein the magnet is arranged on the lift element. This may be advantageous since wires associated with the Hall Effect sensor can be kept shorter if the Hall Effect sensor is not arranged on the lift element because the Hall Effect sensor does not then move in the lift direction during the lift.

According to some embodiments herein the joystick element is arranged to be held in a neutral position relative the chassis by means of a spring element.

According to some embodiments herein the connection is a front suspension of the robotic lawnmower.

DETAILED DESCRIPTION

Figure 1A:
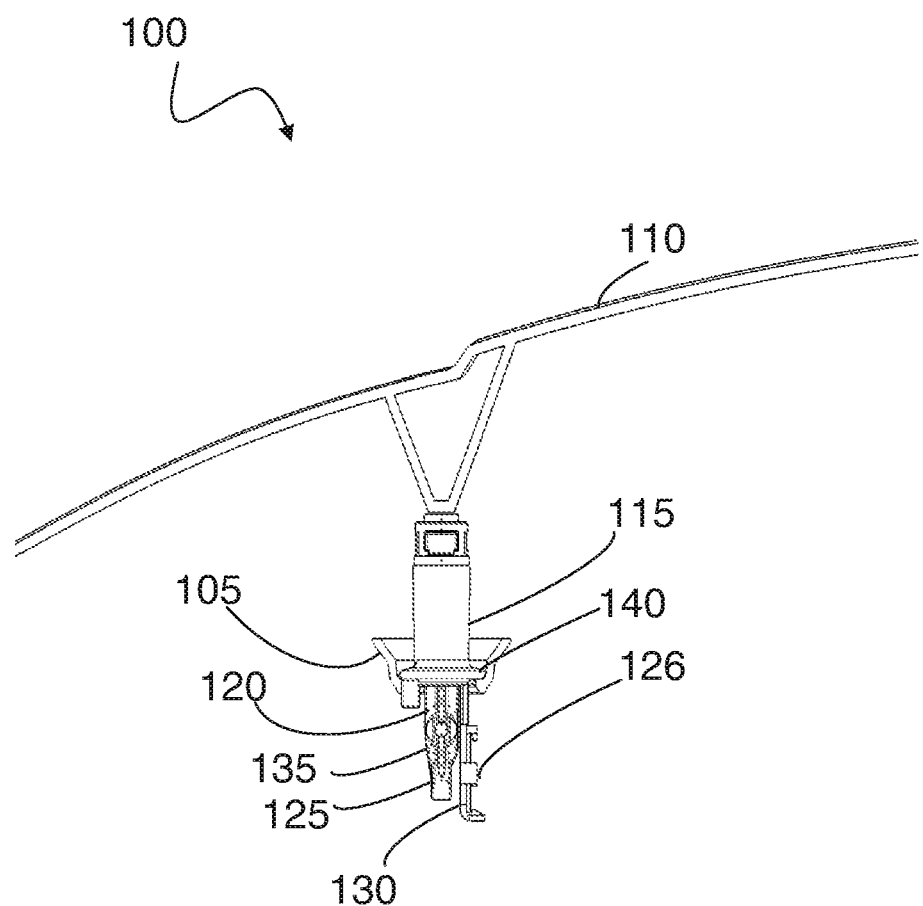
FIG. 1A is a schematic illustration of embodiments of a lift detection arrangement.

FIG. 1A depicts, schematically and by way of example, a side view of a lift detection arrangement 100 in a robotic lawnmower according to some embodiments herein. The lift detection arrangement 100 comprises a connection between a chassis 105, of which only an attachment portion is shown in the FIG. 1A, and a body 110 of the robotic lawnmower. The connection comprises a joystick element 115. The joystick element 115 is pivotably attached to the chassis 105, by means of a pivot connection 140, to be pivotable in a collision plane relative the chassis 105. This is to allow flexibility to the body 110 relative the chassis 105 during a collision. The collision plane may be essentially parallel to the travelling plane of the robotic lawnmower. It is to be understood that the part of the chassis 105 that is illustrated in the FIG. 1 may form an integrated part of the chassis 105 or be a separate part for fixing the joystick element to the chassis 105.

The connection further comprises a lift element 120, which in the illustrated embodiment in FIG. 1 is a sliding member 120 which is arranged to be slideable, i.e. transversally displaced, relative the joystick element 115 in a lift direction during a lift of the body 110. The sliding member 120 hence provides flexibility between the body 110 and the chassis 105 during a lift. The sliding member 120 is in the illustrated example telescopically extendable from the joystick member. The sliding member 120 is at a top portion thereof attached to the body 110.

The lift detection arrangement 100 further comprises a lift sensor. The lift sensor comprises two sensor parts 125, 126. The lift sensor is configured to detect a displacement over a predetermined threshold of the lift element 120 during the lift by detecting a change in spacing between the two sensor parts 125, 126. One of the two sensor parts, the sensor part 125 in this example, is arranged on the sliding member 120 and the other sensor part, the sensor part 126, is in this example arranged on the joystick member 115. The two sensor parts 125, 126 are hence arranged to be relatively displaceable only in the lift direction since the sliding member 120 is only displaceable relative the joystick member 115 in the lift direction. The FIG. 1A illustrates the lift detection arrangement 100 in a neutral position, when there is no lift and no collision. Then, the sensor parts 125, 126 are arranged to be situates essentially opposite each other such that the spacing between them is as small as possible. The two sensor parts 125, 126 may be for example a Hall Effect sensor and a magnet.

If the two sensor elements are placed tight together, a Hall Effect sensor and a magnet can be used, while keeping the total travel of the lift member small. It also makes it possible to remove the magnet and replace the Hall Effect sensor with a micro switch, where the micro switch is actuated by the lift member.

Figure 1B:
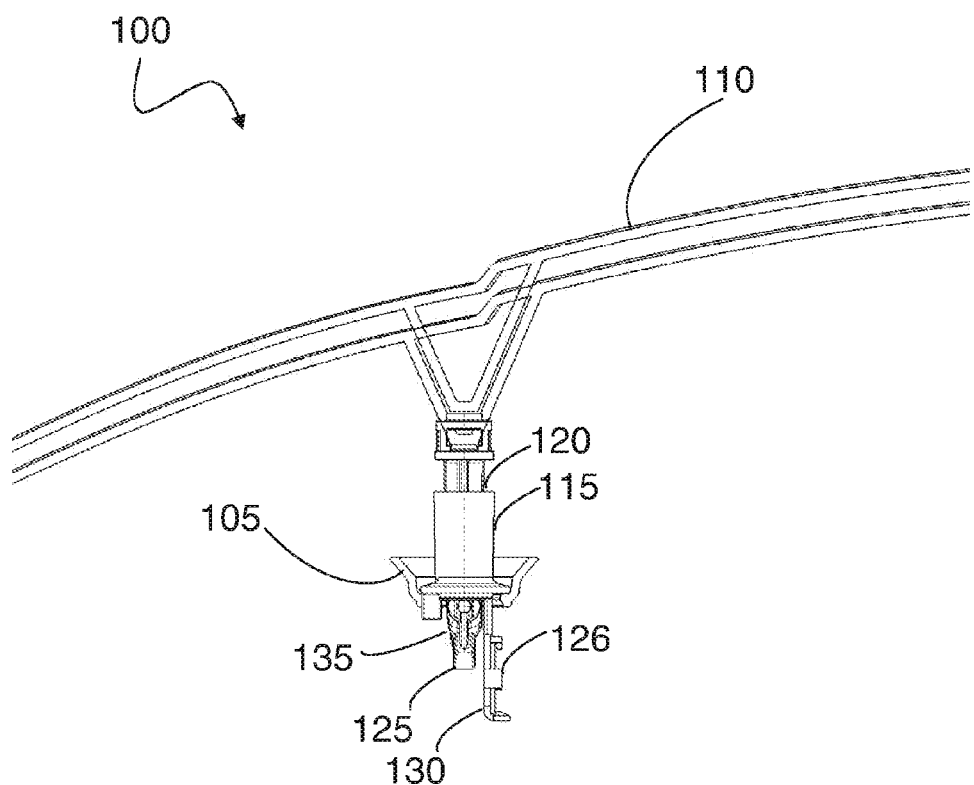
FIG. 1B is a schematic illustration of the lift detection arrangement illustrated in FIG. 1A during a lift.

FIG. 1B illustrates, in a side view, how the lift detection arrangement 100 as described in relation to FIG. 1A operates during a lift. During the lift, the body 110 is lifted relative the chassis 110 thanks to the lift element 120, i.e. the sliding member 120 in this example being attached to the body 110 and slidable attached to the joystick member 115 which in turn is attached to the chassis 105. As the sliding member 120 is displaced in the lift direction during the lift, sliding along the joystick member 115, there is a change in the spacing between the two sensor parts 125, 126. As the sensor part 125 in this example, slides upward with the sliding member 120, it is displaced relative the other sensor part 126. When the displacement is over a certain predetermined threshold, as small as possible, for example 5-10 mm, the lift sensor detects the displacement and determines that there is a lift. In response to the lift detection, the lift sensor may trigger a stop of the robotic lawnmower. This may be done by the lift sensor sending a trigger signal to a not shown control device handling the operation of the robotic lawnmower. It is to be understood, that "sliding" is not limiting, and that the "sliding" movement between the joystick member 115 and the sliding member 120 may be any translational movement in the lift direction, provided for by various ways.

Figure 1C:
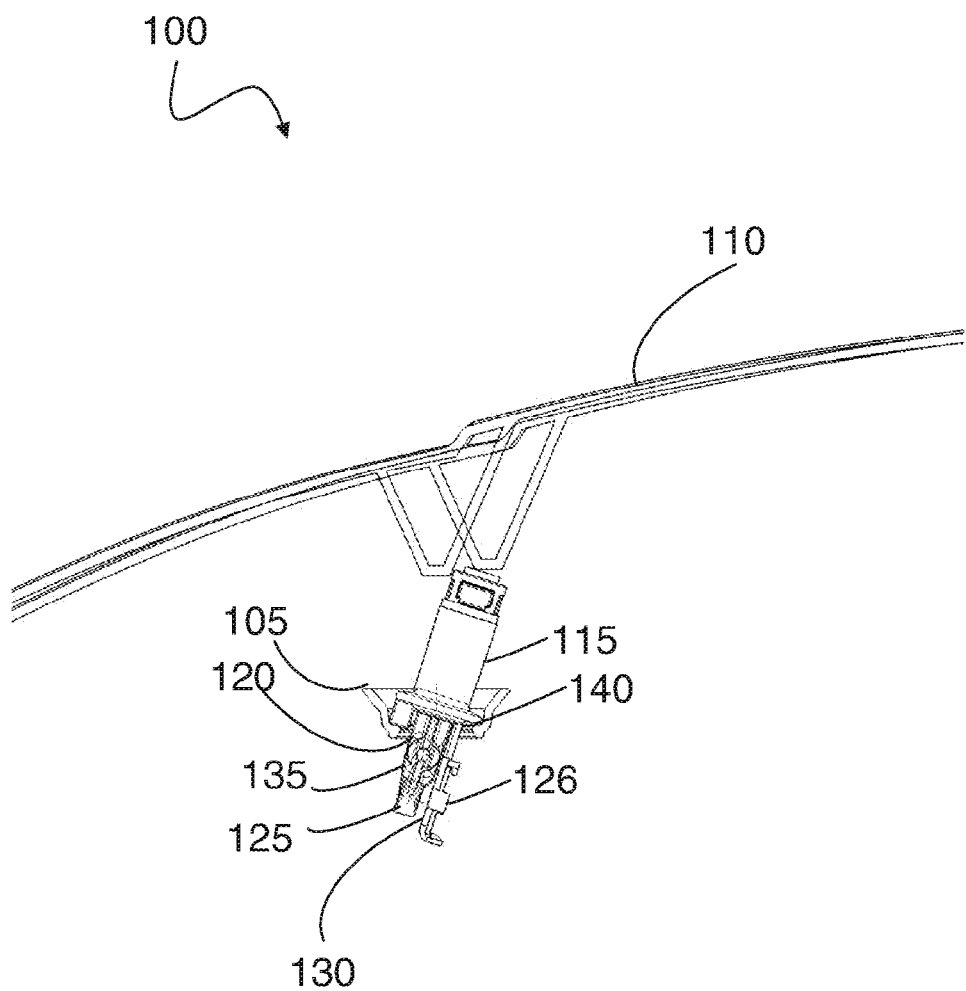
FIG. 1C is a schematic illustration of the lift detection arrangement illustrated in FIGS. 1A and 1C during a collision.

FIG. 1C illustrates, in a side view, how the lift detection arrangement 100 as described in relation to FIGS. 1A and 1B operates during a collision of the robotic lawnmower. During the collision, the body 110 is displaced relative the chassis 105 thanks to the pivotal connection 140 between the joystick element 115 and the chassis 105, which allows pivotation of the joystick element 115 relative the chassis 105 in the collision plane.

Further, the sliding member 120, on which one sensor part 125 is arranged, pivotates along with the joystick member 115 on which the other sensor part 126 is arranged. Hence, thanks to the two sensor parts 125, 126 being arranged such that they are only displaceable in the lift direction, the collision do not cause a change in the spacing between the two sensor parts 125, 126, and false lift detection by the lift sensor can be avoided.

According to some embodiments herein, as previously mentioned, one of the two sensor parts 125, 126 is a Hall Effect sensor and the other one of the two sensor parts 125, 126 is a magnet. As also previously mentioned, the magnet may then be arranged on the lift element, i.e. the sliding member 120 in this example.

This may be advantageous since wires associated with the Hall effect sensor can be kept shorter if the Hall effect sensor is not arranged on the lift element 120 because the Hall effect sensor does not then move in the lift direction during the lift.

According to some embodiments herein the joystick element 115 is arranged to be held in a neutral position relative the chassis 105 by means of not shown a spring element.

According to some embodiments herein the connection is a front suspension of the robotic lawnmower. This may be advantageous for example if one or more rear suspensions are used which have the same, or a similar, joystick elements as the joystick element 115, such that all suspensions provide a stable and desired neutral position during operation of the robotic lawnmower.

Figure 2A:
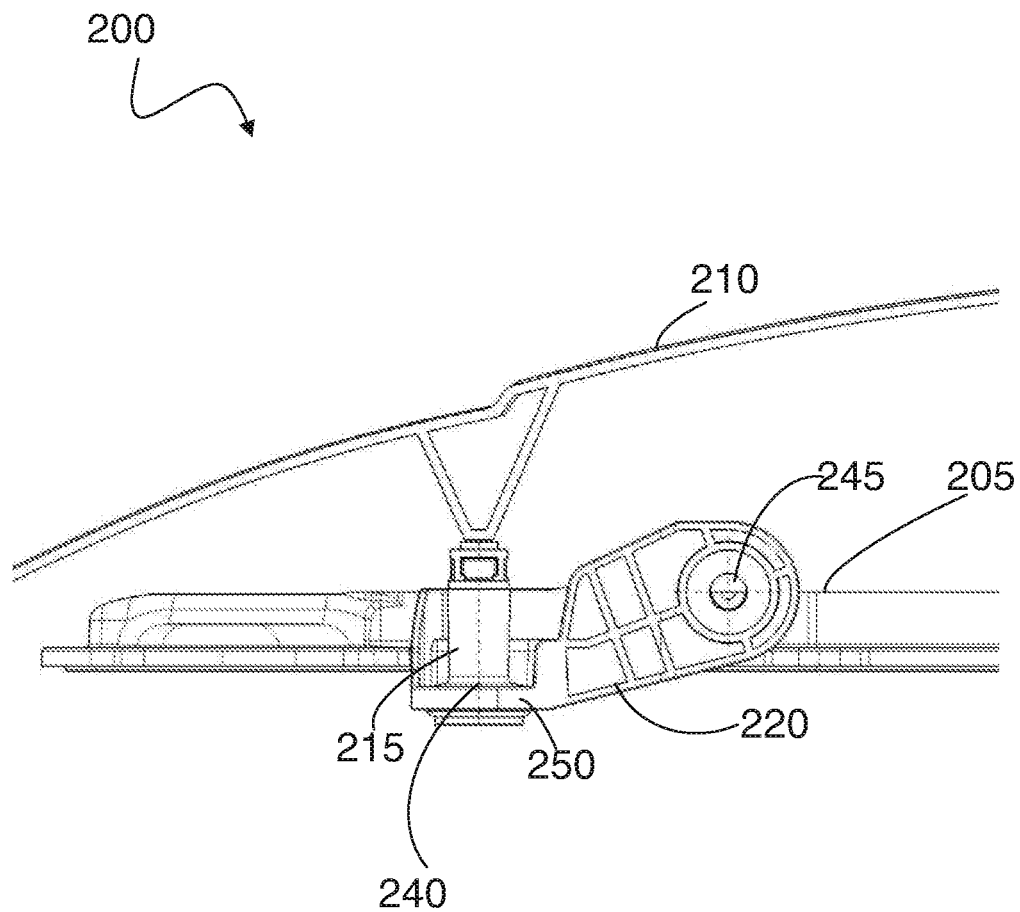
FIG. 2A is a schematic illustration of embodiments of a lift detection arrangement.

FIG. 2A depicts, schematically and by way of example, a side view of a lift detection arrangement 200 in a robotic lawnmower according to some embodiments herein. The lift detection arrangement 200 comprises a connection between a chassis 205, of which only an attachment portion is shown in the figure, and a body 210 of the robotic lawnmower. The connection comprises a joystick element 215. The joystick element 215 is pivotably attached to the chassis 205, by means of a pivot connection 240 to the supporting link arm 220, to be pivotable in a collision plane relative chassis 205. This allows flexibility to the body 210 relative the chassis 205 during a collision.

The connection further comprises a lift element 220 which in the illustrated embodiment in FIG. 2A is a link arm 220. The link arm 220 carries the joystick element 115 in a first end portion 250 thereof, and is rotatably arranged on the chassis 205 at a second end portion 245 thereof to be rotatable relative the chassis 205 in a lift direction. Thanks to the link arm 220 being rotatable relative the chassis 205 in the lift direction flexibility between the chassis 205 and the body 210 in the lift direction during a lift is provided.

The first end portion 250 may be arranged to rest on a not shown support extending from the chassis 205, when there is no lift.

The lift detection arrangement 200 further comprises a lift sensor. The lift sensor comprises two sensor parts 225, 226, which are not shown in the FIG. 2A, but which are illustrated in the FIG. 2B that will be discussed further down in this document.

The lift sensor is configured to detect a displacement over a predetermined threshold of the lift element 220 during the lift by detecting a change in spacing between the two sensor parts 225, 226. One of the two sensor parts, the sensor part 225 in this example, is arranged on the link arm 220 and the other sensor part, the sensor part 226, is in this example arranged on the joystick element 215, at a distance from the rotational connection to the chassis 205, for example at the first end portion 250. The two sensor parts 225, 226 are hence arranged to be relatively displaceable only in the lift direction since the link arm 220 is only is only rotatable relative the chassis 205 in the lift direction.

Figure 2B:
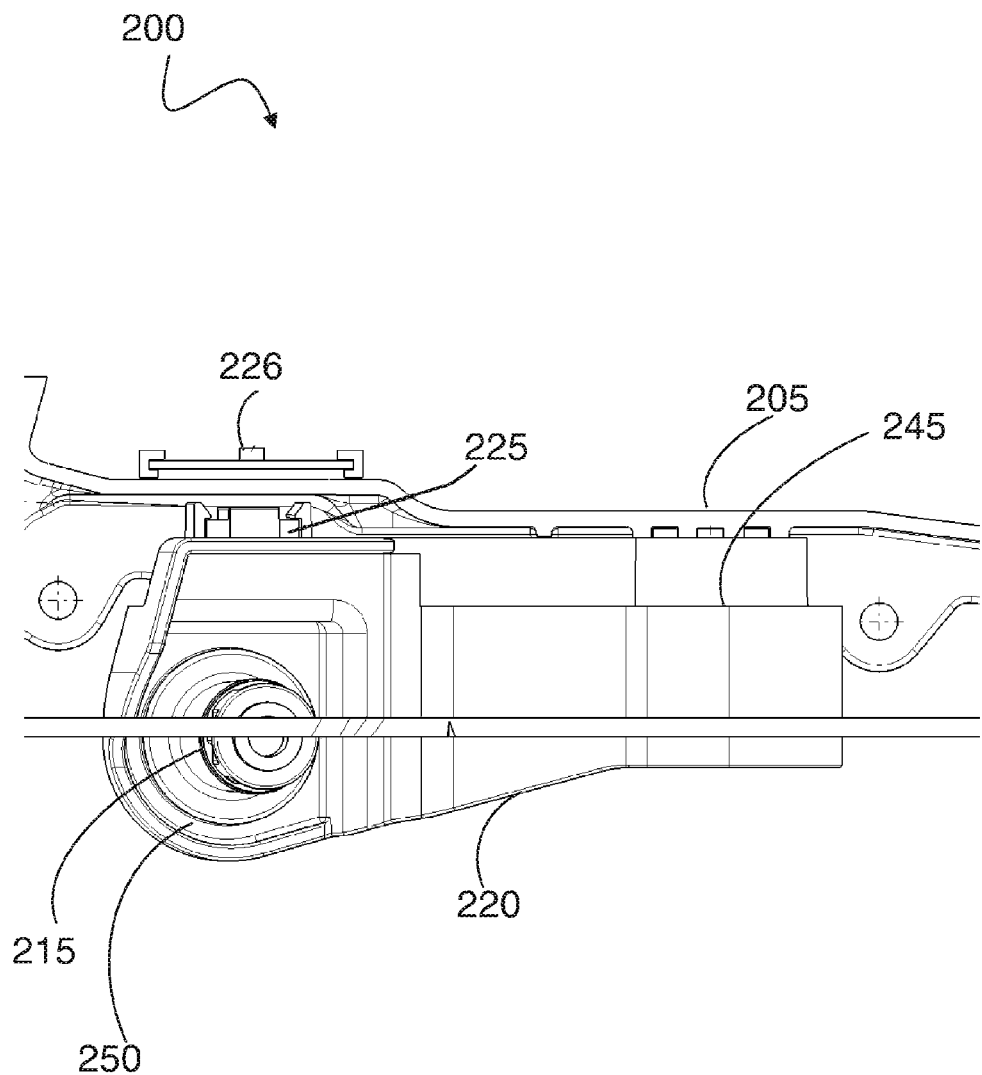
FIG. 2B is a schematic top view illustration of the lift detection arrangement in FIG. 2A.

FIG. 2B schematically depicts a top view of the lift detection arrangement 200 depicted in FIG. 2A. In the view in FIG. 2B, it is illustrated how the two sensor parts 225, 226 may be arranged on the lift detection arrangement 200. In the illustrated example, the sensor part 225 arranged on the link arm 220 is a magnet, and the sensor part 225 arranged on the chassis is a Hall Effect sensor. In other embodiments the sensor parts 225, 226 may be arranged in the opposite way. In some embodiments, the sensor parts 225, 226 may be of other types. The FIG. 2B illustrates the lift detection arrangement in a normal state, where there is no lift and no collision. The two sensor parts 225, 226 are then positioned opposite each other and there is a small spacing between them.

Figure 2C:
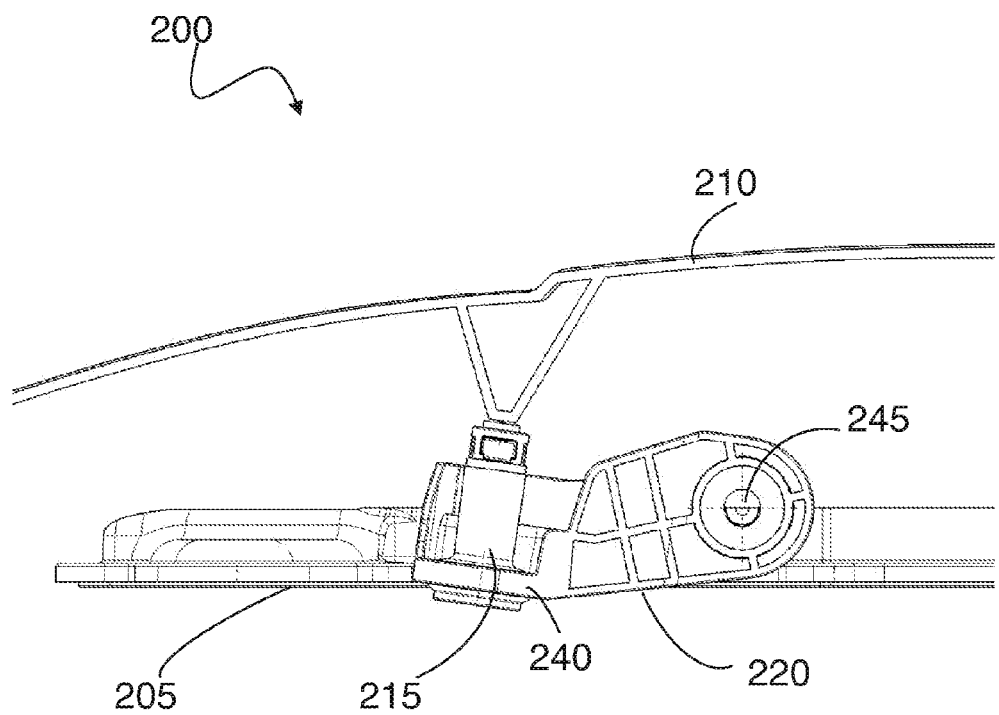
FIG. 2C is a schematic illustration of the lift detection arrangement illustrated in FIGS. 2A and 2B during a lift.

FIG. 2C illustrates, in a side view, how the lift detection arrangement 200 as described in relation to FIGS. 2A and 2B operates during a lift. During the lift, the body 210 is lifted relative the chassis 210 thanks to the lift element 220 i.e. the link arm 220 in this example being rotatable relative the chassis 205 in the lift direction. As the link arm 220 is rotated, or displaced, in the lift direction during the lift, there is a change in the spacing between the two sensor parts 225, 226, since as the sensor part 225 attached to the link arm 220 in this example, moves upward with the link arm 220, it is displaced relative the other sensor part 226. When this displacement is over a certain predetermined threshold, as small as possible, for example 5-15 mm, the lift sensor detects the displacement and determines that there is a lift. In response to the lift detection, the lift sensor may trigger a stop of the robotic lawnmower. This may be done by the lift sensor sending a trigger signal to a not shown control device handling the operation of the robotic lawnmower.

Figure 2D:
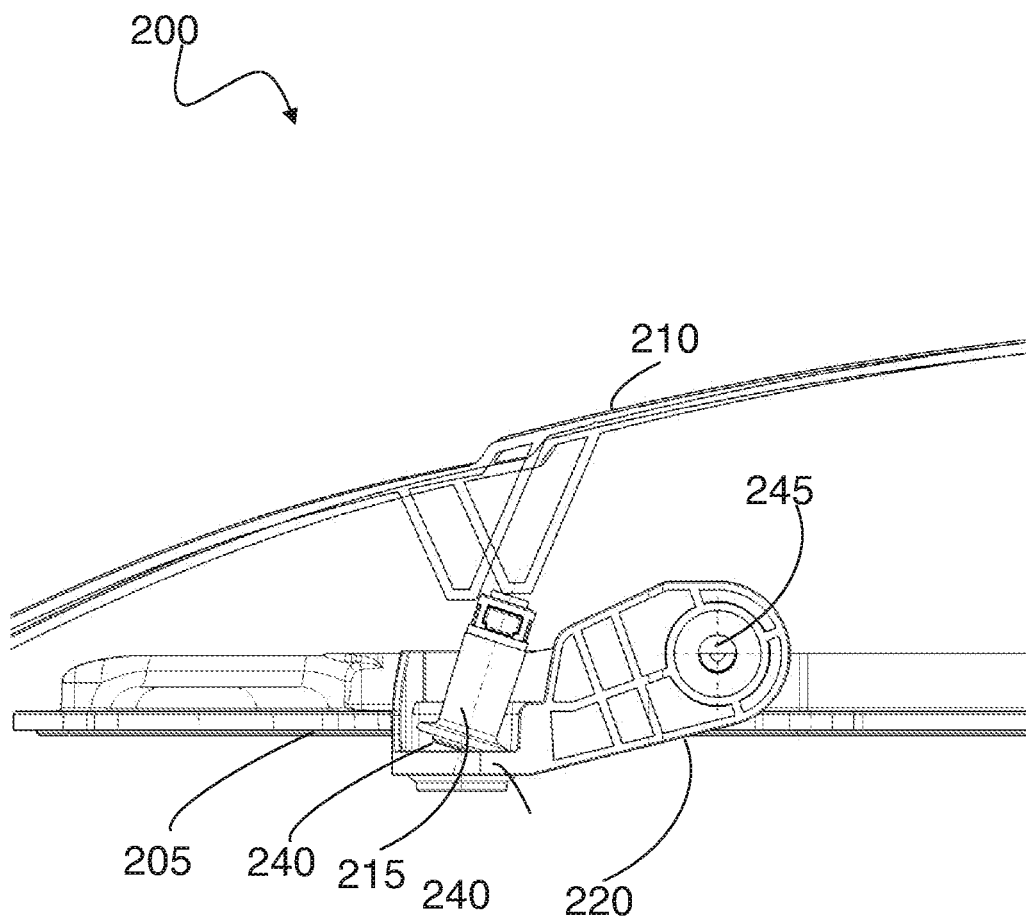
FIG. 2D is a schematic illustration of the lift detection arrangement illustrated in FIGS. 2A and 2B during a collision.

FIG. 2D illustrates, in a side view, how the lift detection arrangement 200 as described in relation to FIGS. 2A, 2B and 2C operates during a collision of the robotic lawnmower. During the collision, the body 210 is displaced relative the chassis 205 thanks to the pivot connection 240 thanks to which the joystick element 115 is pivotable relative the chassis 105 in the collision plane.

The link arm 220, on which one sensor part 225 is arranged, remains still and does not move relative the chassis 205 on which the other sensor part 126 is arranged. Hence, thanks to the two sensor parts 225, 226 being arranged such that they are only displaceable relative each other in the lift direction, the collision does not cause a change in the spacing between the two sensor parts 225, 226, and false lift detection by the lift sensor is avoided.

According to some embodiments herein, one of the two sensor parts 225, 226 is a Hall effect sensor and the other one of the two sensors 225, 226 parts is a magnet If the two sensor elements are placed tight together, a Hall effect sensor and a magnet can be used, while keeping the total travel of the lift member small. It also makes it possible to remove the magnet and replace the Hall Effect sensor with a micro switch, where the micro switch is actuated by the lift member.

According to some embodiments herein the magnet is arranged on the lift element, i.e. on the link arm 220 in this example. This may be advantageous since wires associated with the Hall effect sensor can be kept shorter if the Hall effect sensor is not arranged on the lift element 220 because the Hall effect sensor does not then move in the lift direction during the lift.

According to some embodiments herein, the joystick element 215 is arranged to be held in a neutral position relative the chassis 205 by means of a not shown spring element.

According to some embodiments herein the connection is a front suspension of the robotic lawnmower. This may be advantageous for example if one or more rear suspensions are used which have the same, or a similar, joystick elements as the joystick element 115, such that all suspensions provide a stable and desired neutral position when there during operation of the robotic lawnmower.

When using the word "comprise" or "comprising" it shall be interpreted as non-limiting, i.e. meaning "consist at least of".

The term "arranged to" used herein may also be referred to as "configured to".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A lift detection arrangement in a robotic lawnmower for detecting a lift of a body of the robotic lawnmower relative a chassis of the robotic lawnmower, characterized by a connection between the chassis and the body, the lift detection arrangement comprising:
   a joystick element; and
   a lift element, which
   wherein the joystick element is arranged to allow a displacement of the body relative the chassis in a collision plane during a collision of the robotic lawnmower, and
   wherein the lift element is arranged to provide a flexibility between the chassis and the body in a lift direction during the lift, and wherein the lift detection arrangement further comprises a lift sensor configured to detect a displacement over a predetermined threshold of the lift element during the lift by detecting a change in a spacing between two sensor parts of which one is arranged on the lift element, wherein the two sensor parts are arranged to be relatively displaceable only in the lift direction, wherein the lift element is a sliding member which is slidingly arranged relative the joystick element in the lift direction to provide the flexibility during the lift, and wherein one of the two sensor parts is arranged on the joystick element and the other of the two sensor parts is arranged on the sliding member.

2. The lift detection arrangement according to claim 1, wherein the sliding member is telescopically extendable from the joystick element in the lift direction.

3. The lift detection arrangement according to claim 1, wherein the sensor parts are arranged on respective downwardly protruding end portions of the joystick element and the sliding member, the end portions being arranged at a distance from a pivot connection between the joystick element and the chassis.

4. The lift detection arrangement according to claim 1, wherein one of the two sensor parts is a Hall Effect sensor and the other of the two sensor parts is a magnet.

5. The lift detection arrangement according to claim 4, wherein the magnet is arranged on the lift element.

6. The lift detection arrangement according to claim 1, wherein the connection is a front suspension of the robotic lawnmower.

7. The lift detection arrangement according to claim 1, wherein detecting a displacement over a predetermined threshold comprises detection of the lift and wherein detection of the lift triggers the robotic lawnmower to stop.

8. The lift detection arrangement according to claim 1, wherein detecting a displacement over a predetermined threshold comprises detection of the lift and wherein detection of the lift triggers the robotic lawnmower to stop rotation of one or more cutting blades.

\* \* \* \* \*